United States Patent
Cai et al.

(10) Patent No.: US 9,762,351 B2
(45) Date of Patent: Sep. 12, 2017

(54) STATISTICS ADAPTIVE SOFT DECISION FORWARD ERROR CORRECTION IN DIGITAL COMMUNICATION

(71) Applicant: ZTE (USA) Inc., Morristown, NJ (US)

(72) Inventors: Yi Cai, Jackson, NJ (US); Zhensheng Jia, Morganville, NJ (US)

(73) Assignee: ZTE (USA) Inc., Richardson, TX (US)

( * ) Notice: Subject to any disclaimer, the term of this patent is extended or adjusted under 35 U.S.C. 154(b) by 0 days.

(21) Appl. No.: 14/220,049

(22) Filed: Mar. 19, 2014

(65) Prior Publication Data

US 2014/0325319 A1 Oct. 30, 2014

Related U.S. Application Data

(60) Provisional application No. 61/803,779, filed on Mar. 20, 2013.

(51) Int. Cl.
*H04L 1/00* (2006.01)
*H04B 10/80* (2013.01)
*H04L 25/03* (2006.01)

(52) U.S. Cl.
CPC ...... *H04L 1/0054* (2013.01); *H04L 25/03286* (2013.01)

(58) Field of Classification Search
None
See application file for complete search history.

(56) References Cited

U.S. PATENT DOCUMENTS

| | | | |
|---|---|---|---|
| 5,271,042 A | 12/1993 | Borth et al. | |
| 5,809,090 A | 9/1998 | Buternowsky et al. | |
| 5,812,334 A | 9/1998 | Behrens et al. | |
| 6,226,323 B1 | 5/2001 | Tan et al. | |
| 6,490,243 B1 | 12/2002 | Tanaka et al. | |
| 6,842,495 B1 | 1/2005 | Jaffe et al. | |
| 7,027,537 B1 | 4/2006 | Cheong et al. | |
| 7,266,310 B1 * | 9/2007 | Savory | H04B 10/61 398/205 |

(Continued)

FOREIGN PATENT DOCUMENTS

| CN | 1050958 A | 4/1991 |
|---|---|---|
| CN | 1393066 A | 1/2003 |

(Continued)

OTHER PUBLICATIONS

Hui, D.; Ramesh, R., "Maximum likelihood sequence estimation in the presence of constant envelope interference [cellular radio networks]," in Vehicular Technology Conference, 2003. VTC 2003-Fall. 2003 IEEE 58th , vol. 2, No., pp. 1060-1064 vol. 2, Oct. 6-9, 2003.*

S. Lobanov, S. Raghavan, J. Downie, M. Sauer and J. Hurley, "Influence of non-Gaussian statistics in duobinary transmission," 2006 Conference on Lasers and Electro-Optics and 2006 Quantum Electronics and Laser Science Conference, Long Beach, CA, 2006, pp. 1-2.*

(Continued)

*Primary Examiner* — Justin R Knapp
(74) *Attorney, Agent, or Firm* — Perkins Coie LLP

(57) ABSTRACT

A digital communication receiver uses a maximum likelihood sequence estimation stage to recover symbols from digitized sample values of a received signal. A probability density function is calculated and used to improve a soft decision forward error correction calculation. The results of error decoding, which represent error corrected data bits, are further used to improve the probability density function calculation.

8 Claims, 8 Drawing Sheets

(56) References Cited

U.S. PATENT DOCUMENTS

| | | | |
|---|---|---|---|
| 8,041,233 B2* | 10/2011 | Hueda | H04B 10/60 398/140 |
| 8,156,397 B2 | 4/2012 | Heiman et al. | |
| 8,379,709 B2* | 2/2013 | Hui | H04L 25/0228 375/232 |
| 8,488,726 B2* | 7/2013 | Hueda | H04L 25/0202 375/136 |
| 8,571,416 B2 | 10/2013 | Grobe | |
| 8,649,453 B2* | 2/2014 | Hui | H04L 25/067 375/148 |
| 9,329,929 B2 | 5/2016 | Jia et al. | |
| 2001/0001616 A1 | 5/2001 | Rakib et al. | |
| 2002/0196844 A1 | 12/2002 | Rafie et al. | |
| 2003/0058952 A1 | 3/2003 | Webster et al. | |
| 2005/0177860 A1 | 8/2005 | Goyal et al. | |
| 2005/0280568 A1* | 12/2005 | Rowland | H03M 1/0809 341/155 |
| 2006/0056547 A1* | 3/2006 | Buchali | H03M 1/186 375/341 |
| 2006/0274861 A1* | 12/2006 | Langenbach | H04L 25/03197 375/341 |
| 2008/0199191 A1* | 8/2008 | Essiambre | H04B 10/697 398/208 |
| 2009/0092208 A1* | 4/2009 | Montekyo | H04L 1/205 375/346 |
| 2009/0110124 A1 | 4/2009 | Fatemi-Ghomi et al. | |
| 2009/0177945 A1 | 7/2009 | Djordjevic et al. | |
| 2009/0225899 A1 | 9/2009 | Dent | |
| 2009/0285278 A1 | 11/2009 | Mamaril et al. | |
| 2010/0202504 A1 | 8/2010 | Murali et al. | |
| 2012/0068748 A1 | 3/2012 | Stojanovic et al. | |
| 2012/0224846 A1 | 9/2012 | Swanson et al. | |
| 2013/0138375 A1 | 5/2013 | Zhou et al. | |
| 2014/0219666 A1 | 8/2014 | Tselniker et al. | |
| 2014/0233966 A1 | 8/2014 | Yu et al. | |
| 2014/0289589 A1 | 9/2014 | Jia et al. | |
| 2016/0020857 A1 | 1/2016 | Jia et al. | |
| 2016/0105245 A1 | 4/2016 | Cai et al. | |

FOREIGN PATENT DOCUMENTS

| | | |
|---|---|---|
| EP | 1 213 852 A1 | 6/2002 |
| WO | 2007/021952 A2 | 2/2007 |

OTHER PUBLICATIONS

S. A. Fahmy, "Histogram-based probability density function estimation on FPGAs," Field-Programmable Technology (FPT), 2010 International Conference on, Beijing, 2010, pp. 449-453. doi: 10.1109/FPT.2010.5681457.*

Cai, Y., et al., "On turbo Code Decoder Performance in Optical-Fiber Communication Systems With Dominating ASE noise," Journal of Lightwave Technology, 21(3):727-734, Mar. 2003.

Djordjevic, I.B., et al., "Achievable Information Rates for High-Speed Long-Haul Optical Transmission," Journal of Lightwave Technology, 23(11):3755-3763, Nov. 2005.

Djordjevic, I.B., et al., "Suppression of Fiber Nonlinearities and PMD in Coded-Modulation Schemes With Coherent Detection by Using Turbo Equalization," Journal of Optical Communications and Networking, 1(6):555-564, Nov. 2009.

European Search Report mailed on Aug. 26, 2014 for European Application No. 14160741.6, filed Mar. 19, 2014 (5 pages).

Forney, G.D., Jr., "Maximum-Likelihood Sequence Estimation of Digital Sequences in the Presence of Intersymbol Interference," IEEE Transactions on Information Theory, IT-18(3):363-378, May 1972.

Jia, Z., et al., "Experimental demonstration of iterative post-equalization algorithm for 37.5-Gbaud PM-16QAM quad-carrier Terabit superchannel," Optics Express, 23(3):2157-2162, Feb. 2015.

European Search Report mailed on Dec. 14, 2015 for European Application No. 15275173.1, filed Jul. 13, 2015 (8 pages).

European Search Report mailed on Feb. 19, 2016 for European Application No. 15275211.9, filed Oct. 7, 2015 (12 pages).

Fatadin, I., et al., "Carrier Phase Recovery for 16-QAM Using QPSK Partitioning and Sliding Window Averaging," IEEE Photonics Technology Letters, 26(9):854-857, May 2014.

Gao, Y., et al., "Low-Complexity Two-Stage Carrier Phase Estimation for 16-QAM Systems using QPSK Partitioning and Maximum Likelihood Detection," Optical Fiber Communication Conference/National Fiber Optic Engineers Conference 2011, OSA Technical Digest (CD) (Optical Society of America, 2011), paper OMJ6, 3 pages, Mar. 2011.

Chinese Office Action dated Nov. 15, 2016 for Chinese Application No. 201410104337.7, filed Mar. 20, 2014 (6 pages).

Chinese Office Action dated Nov. 28, 2016 for Chinese Application No. 201410103677.8, filed Mar. 20, 2014 (12 pages).

* cited by examiner

STATISTICS ADAPTIVE SOFT DECISION FORWARD ERROR CORRECTION IN DIGITAL COMMUNICATION

CROSS REFERENCE TO RELATED APPLICATIONS

This patent document claims the benefit of priority of U.S. Provisional Patent Application No. 61/803,779, filed on Mar. 20, 2013. The entire content of the before-mentioned patent application is incorporated by reference herein.

BACKGROUND

This patent document relates to receiving error correction coded digital communication signals.

There is an ever-growing demand for data communication in application areas such as wireless communication, fiber optic communication and so on. The demand on core networks is especially higher because not only are user devices such as smartphones and computers using more and more bandwidth due to multimedia applications, but also the total number of devices for which data is carried over core networks is increasing.

SUMMARY

In some disclosed embodiments, a soft decision maximum likelihood sequence estimation (MLSE) technique is used to estimate received demodulated signal data prior to forward error decoding. The soft decision outputs are input to a probability density function (PDF) estimation module and a forward error correction (FEC) module. The FEC module also uses results of PDF calculations to make produced FEC corrected output data bits. The output data bits are optionally used to further improve the PDF estimation.

In some embodiments, methods and apparatus for generating data bits from a received signal includes modules for and a procedure for processing the received signal to generate a sequence of signal values, converting the sequence of signal values to data value estimates using a soft decision maximum likelihood sequence estimation technique in which an estimation probability is associated with each data value estimate, computing a probability density function of data values based on the data value estimates and forward error decoding, using the data value estimates and the probability density function, the data values to generate data bits. The received signals may be wireless signals or optical communication signals.

In another aspect, an optical communication system includes a source of forward error corrected and spectrum shaped optical communication signals and an optical communications receiver comprising a digital signal processing stage in which a soft-decision based MLSE module inputs data estimates to a forward error correction module (FEC) that outputs error corrected data bits. The FEC module uses a first input comprising soft decisions from the MLSE module and a second input comprising an estimated probability density function (PDF) of the data bits. The PDF is computed based on previously decoded data bits and output data estimates from the MLSE module.

DETAILED DESCRIPTION

Figure 1:
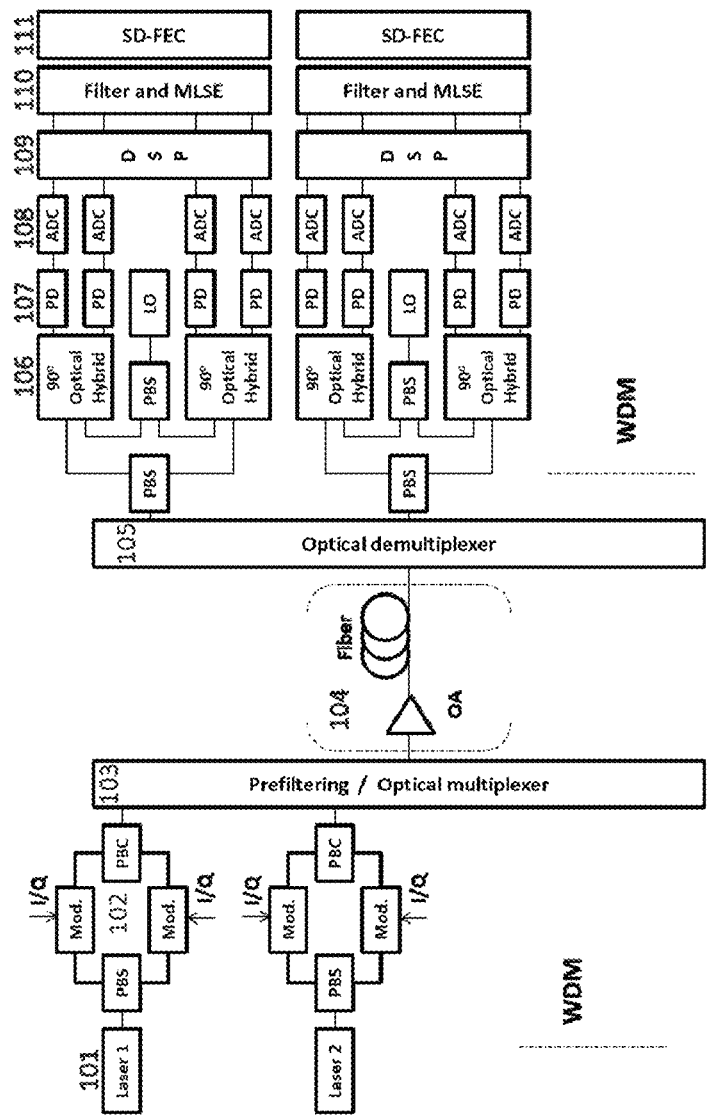
FIG. 1 shows a prefiltering/Nyquist WDM transmission system with coherent detection.

The present document discloses, among other aspects, a method for receiving and detecting optical signal in a coherent optical receiver employing both maximum likelihood sequence estimation (MLSE) and soft-decision forward error correction (FEC). Specifically, one disclosed embodiment relates to adaptively estimate the signal sample statistics at the output of a MLSE module, which is fed into a following soft-decision FEC module for log likelihood calculation in decoding. The statistics-adaptive soft-decision FEC improves the error correction decoding performance and increases system margin on required optical signal to noise ratio (ROSNR). The disclosed techniques can be used in the reception of optical, wired or wireless modulated communication signals in which data bits are encoded using a forward error code.

Optical transmission systems based on coherent detection and digital signal processing (DSP) have established their indispensable roles in ultra-high speed optical transport to improve the receiver sensitivity and achieve superior channel equalization of signal impairments. Increased receiver sensitivity or lower required optical signal to noise ratio (ROSNR) and spectral efficiency (SE) are two aspects in developing high speed optical transmission systems. Soft-decision FEC is a powerful method to improve receiver sensitivity. MLSE on the other hand is effective in compensating inter-symbol-interference which can be a severe impairment in high SE systems with strong filtering effect. To achieve both of the receiver sensitivity and SE goals, embodiments can use the statistic-adaptive soft-decision FEC for coherent optical MLSE receiver to adaptively optimize the FEC performance based on different signal statistic output by the MLSE.

Digital signal processing in coherent optical receivers can utilize adaptive finite-impulse-response (FIR) filters and MLSE to compensate the ISI, ICI (inter-symbol interference and inter-channel interference) and other signal distortions. In addition to the FIR and MLSE based ISI/ICI equalization, FEC is another key module in a coherent optical receiver. The FEC applied in optical communication systems has gone through 3 generations, i.e., hard-decision single code FEC, hard-decision concatenated code FEC, and soft-decision concatenated code FEC. A hard-decision FEC decoder receives data streams consisting only of the binary digits 0 and 1. Hard-decision decoding will normally be performed based on the algebraic code format. With this decoding mode, statistical characteristics of channel interference in a signal are lost. On the other hand, a soft-decision (SD) FEC improves the decoding performance by taking into account signal statistic distribution contained in the soft values of signal samples.

A commonly used signal statistics model in FEC decoding has a Gaussian or normal distribution. In practical transmission systems, however, the input signal of an FEC decoder may have a statistic distribution different from a Gaussian or normal distribution and the signal statistics may also change for different channel conditions such as OSNR, etc. Hence, to fully utilize the error correction capability of a SD FEC code, it is useful for the decoder to have accurate prior knowledge about the received signal statistic. If the signal statistics is dynamic (changing with time), it may be adaptively tracked or estimated to achieve an optimal FEC performance.

In a coherent optical receiver employing both MLSE and FEC, an FEC module takes in the output signal from an MLSE module. It is observed that the output signal samples of a MLSE module have a non-Gaussian and dynamic statistic distribution. The disclosed techniques can be used by various embodiments for the purpose of adaptively optimizing the FEC performance based on different signal statistic output by the MLSE. One example method takes soft values output from an MLSE module, adaptively estimates the corresponding signal statistics, provides the statistic distribution to a following FEC decoder, and gets feedback from the decoding results to further improve the accuracy of the signal statistic estimation. The method described here may be applied in optical communication system with spectral narrowing impairment and other systems that use MLSE and SD-FEC technologies.

Several embodiments will be described more fully hereinafter with reference to the accompanying drawings. Indeed, the subject technology may be embodied in many different forms and should not be construed as limited to the embodiments set forth herein. Like numbers refer to like elements throughout.

The basic prefiltering or Nyquist WDM transmission system with coherent detection is shown in FIG. 1 as the exemplary embodiment. The lightwave generated laser (101) is split by a polarization beam splitter (PBS) and individually modulated by a QPSK optical modulator, and then combined with a polarization beam combiner (PBC) to realize polarization multiplexed QPSK modulation (102). This NRZ-QPSK modulation can be realized by cascaded serial or parallel modulators. Then, optical multiplexer (103) with narrow-band optical filtering function is used to perform aggressive spectrum shaping and multiplexing function to obtain Nyquist (symbol bandwidth=channel spacing) or faster-than Nyquist WDM signals (symbol bandwidth<channel spacing). The transmission link (104) is uncompensated for chromatic dispersion (CD) with the consisting of optical amplifier (OA) and fiber at each span. After transmission, the optical demultiplexer (105) is used to demultiplex the WDM channels to the coherent detection. At the receiver side, LO signal after PBS is launched into the 90° optical hybrid (106) with the polarization split incoming transmitted signal. The diversified signals are sent to photodiode (PD) (107) and digitally sampled with analog-to-digital converter (ADC) (108). The regular digital signal processing unit (109) is then followed to compensate the optical front end (106 and 107) distortion, and then equalize the static and dynamic linear impairments, timing and carrier recovery.

Figure 2:
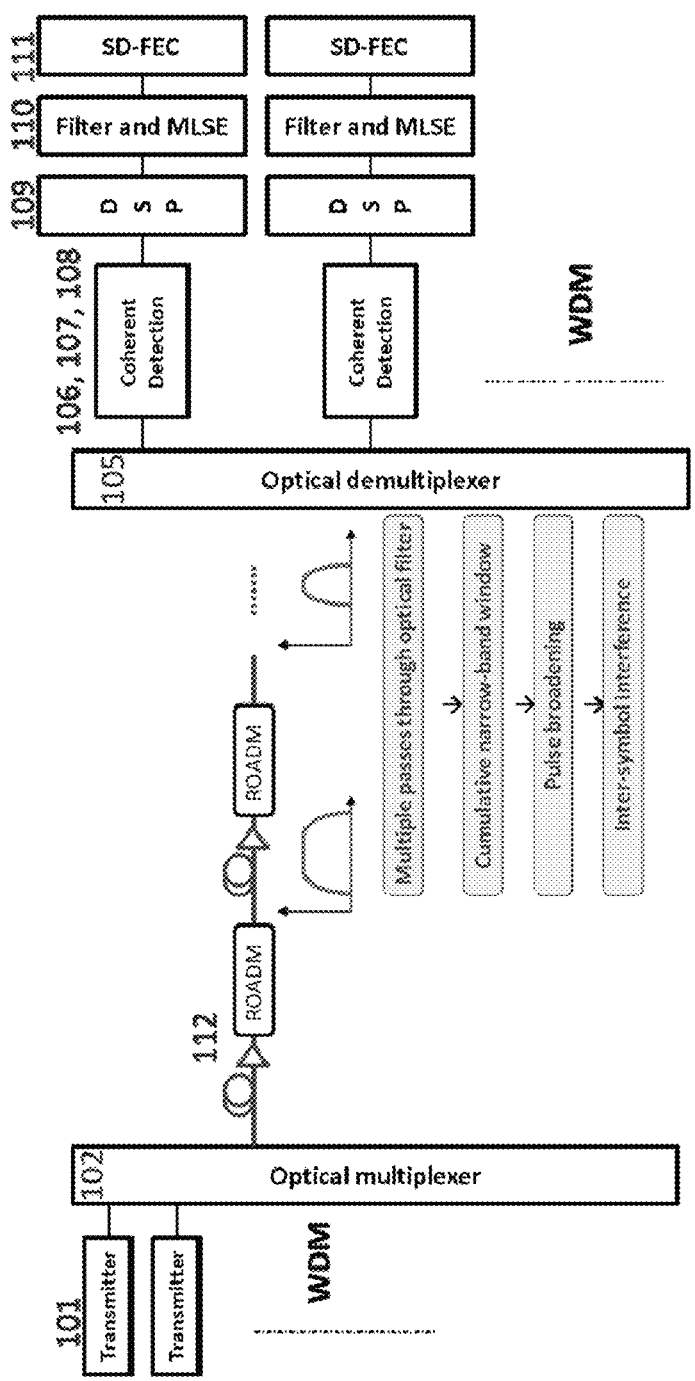
FIG. 2 shows a multiple cascaded ROADM transmission system with coherent detection

To facilitate ease of optical networking, tolerance of spectrum narrowing is performed, as signal channel spacing is degraded after transmission through optical channel, especially when reconfigurable optical add/drop multiplexers (ROADMs) (112) nodes are used in the network as the second exemplary embodiment shown in FIG. 2. Spectrum narrowing severely induces ISI between consecutively transmitted symbols.

Figure 3:
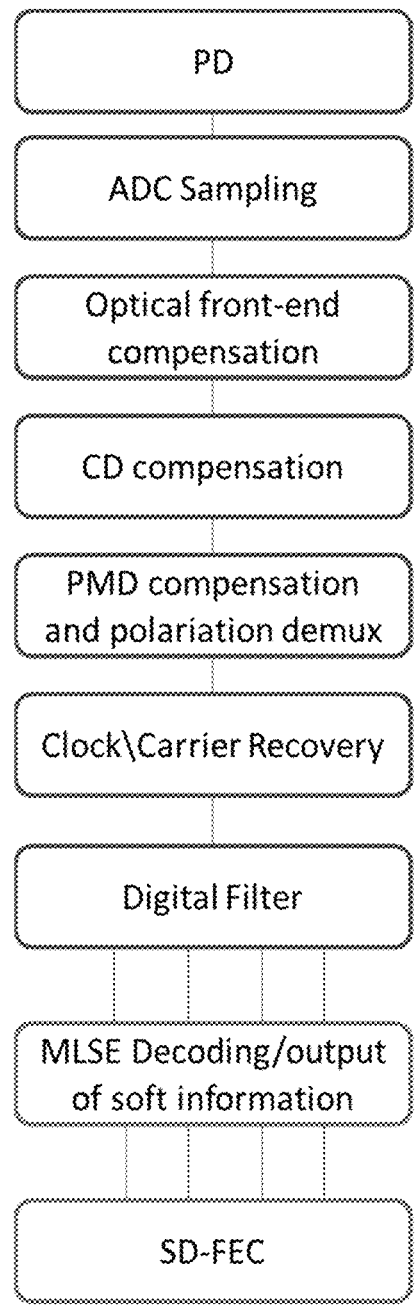
FIG. 3 shows an exemplary embodiment of DSP process

Conventional DSP algorithm using adaptive decision feed forward equalizer is an inefficient solution for the particular ISI compensation, since this finite impulse response (FIR) filter enhance noise during compensation of spectrum narrowing. In addition to the regular DSP in conventional coherent detection, additional digital filter and maximum likelihood sequence estimation (MLSE) algorithm are used to suppress noise and crosstalk to realize optimum detection (110) in strong filtering channels. The DSP process procedure as an exemplary embodiment is shown in FIG. 3.

MLSE method has been successfully proved to mitigate ISI. To further improve the system performance, SD FEC is used by insertion of a suitable error correction code into a transmitted data stream to facilitate detection and correction of data errors. In SD FEC, multiple bit "soft" information is generated that represents a confidence level or reliability of the received data (e.g., whether a bit is very likely one, likely one, likely zero, or very likely zero). To implement SD-FEC decoding, the MLSE may generate the "soft" data stream in combination with the conventional "hard" information.

Figure 4:
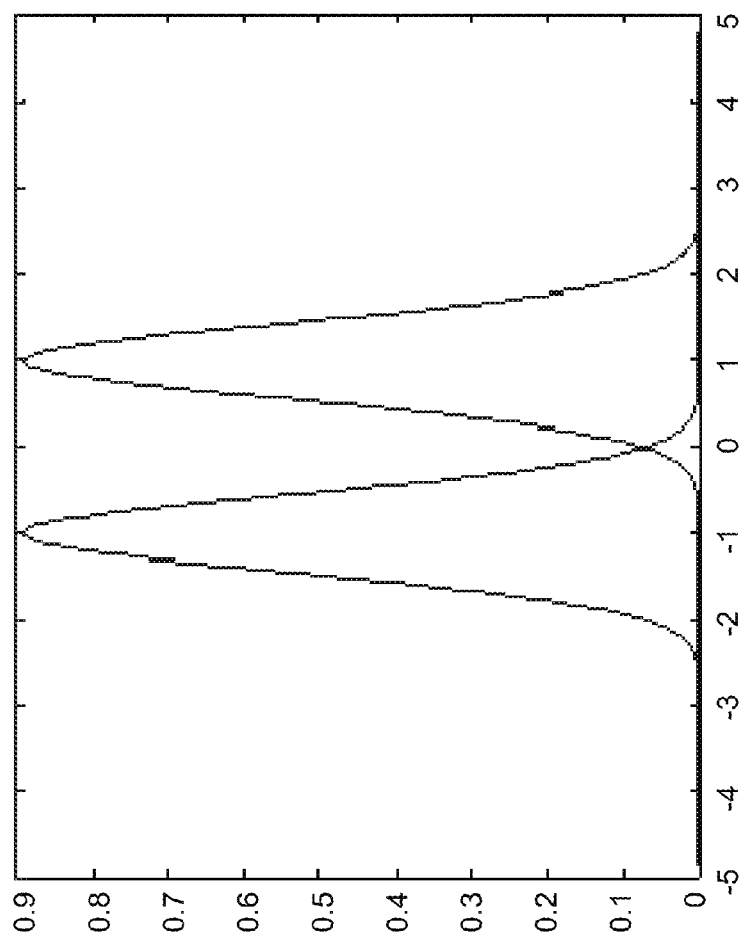
FIG. 4 shows a probability density function of a normal distribution that is commonly assumed in a soft-decision FEC decoder

For SD FEC decoding, the decoder needs to have a priori knowledge of the statistics of the input soft-decision samples. A commonly used assumption of the input soft-decision values has a normal distribution corresponding to additive white Gaussian noise (AWGN) channels. The general formula of a normal distribution probability density function (PDF) is given by $$p_1(I) = \frac{1}{\sqrt{2\pi\sigma_1^2}} \exp\left(\frac{-(I-I_1)^2}{2\sigma_1^2}\right), \quad (1)$$

$$p_0(I) = \frac{1}{\sqrt{2\pi\sigma_0^2}} \exp\left(\frac{-(I-I_0)^2}{2\sigma_0^2}\right), \quad (2)$$

where $I_1$, $I_0$, $\sigma_1$, and $\sigma_0$ represent means and variances of the received signals carrying information "1" and "0", respectively. FIG. 4 depicts an example of the normal distribution PDF of received signal with a bipolar modulation at a given signal to noise ratio. The horizontal axis in FIG. 4 represents possible signal values and the vertical axis represents probability of a given signal value. As can be seen, the relative separation of the curve in FIG. 4 makes the decision process simple.

A key term in SD FEC decoding is the log likelihood ratio (LLR) defined as $$L(I) = \log\left(\frac{p_1(I)}{p_0(I)}\right), \quad (3)$$

which represents the likelihood of a received signal sample I being a transmitted "0" or "1". Clearly, the exponential calculation in the normal distribution PDF shown in Eq. (1) and (2) can be cancelled out by the logarithm calculation in Eq. (3) and, thus, the LLR of a signal with normal distribution can be obtained by directly using its soft-decision value, which can simplify the decoding complexity. For signal with a statistics different from the normal distribution, however, the simplification may degrade the FEC decoding performance.

Figure 5:
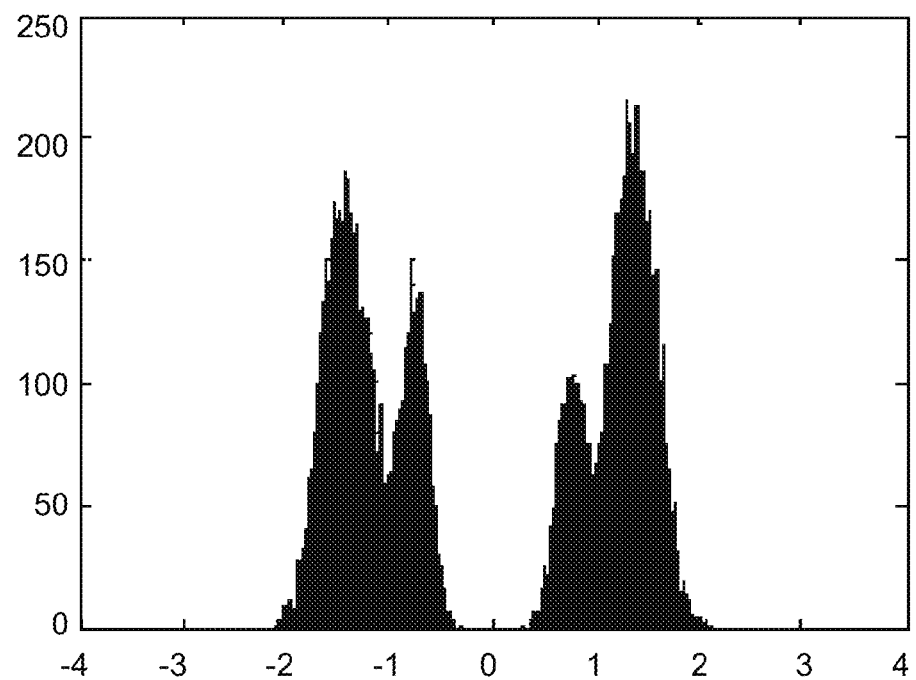
FIG. 5 shows statistic histograms of signal samples observed at the output of a MLSE module employed for narrow filtering induced ISI compensation in a coherent optical receiver.
Figure 5:
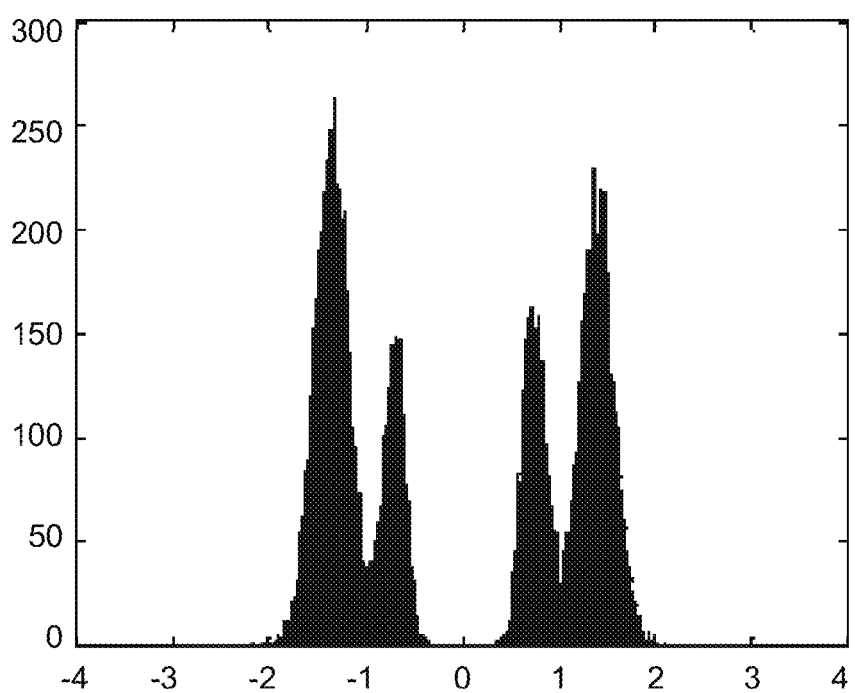

FIG. 5 shows the statistic histograms of the signal samples observed for two different OSNRs at the output of a MLSE module employed for narrow filtering induced ISI compensation in an experiment with a coherent optical receiver. The signal distributions observed in the experiments are different from the normal distribution shown in FIG. 4. For example, each of the two main PDF groupings in FIG. 5 is itself split into two different peaks. This type of PDF may be seen, e.g., when duo-binary input signals are received, with the spread of probability among different combinations of signal values +1 and −1. Due to the non-uniform nature of the lobes, which now includes peaks and troughs, a simplistic decision technique may result in false symbol decisions.

Figure 6:
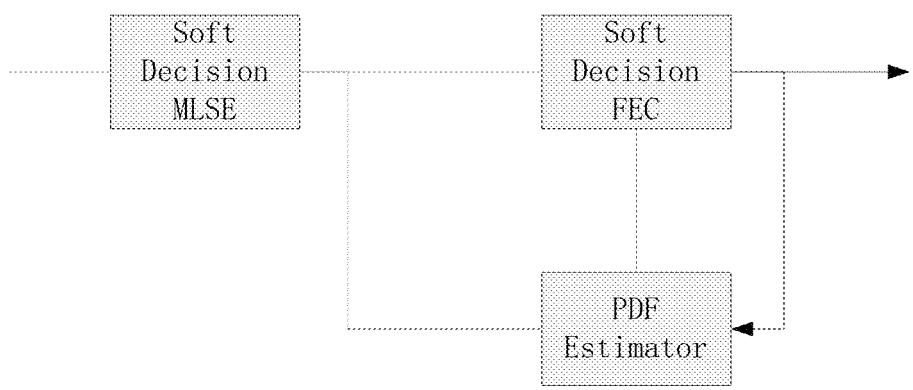
FIG. 6 shows the structure of a statistic adaptive soft-decision FEC subsystem.

To improve the FEC performance by having a better knowledge of the input signal statistics, a SD FEC subsystem with a structure shown in FIG. 6 can be used. In this structure, a PDF estimator is added after between the soft-decision MLSE module and the SD FEC module, and a feed-back loop is induced from the SD FEC module to the PDF estimator. The PDF estimator takes soft signal sample values output from the MLSE module and accumulates up a signal statistic histogram similar to the ones shown in FIG. 5. Based on the histogram, a PDF corresponding to the signal statistic distribution can be estimated numerically or analytically. The estimated PDF is fed into the SD FEC for the LLR calculation such as but not limited to the one shown in Eq. (3). The SD FEC decoding output can be fed back to the PDF estimator to iteratively improve the PDF estimation accuracy.

Figure 7:
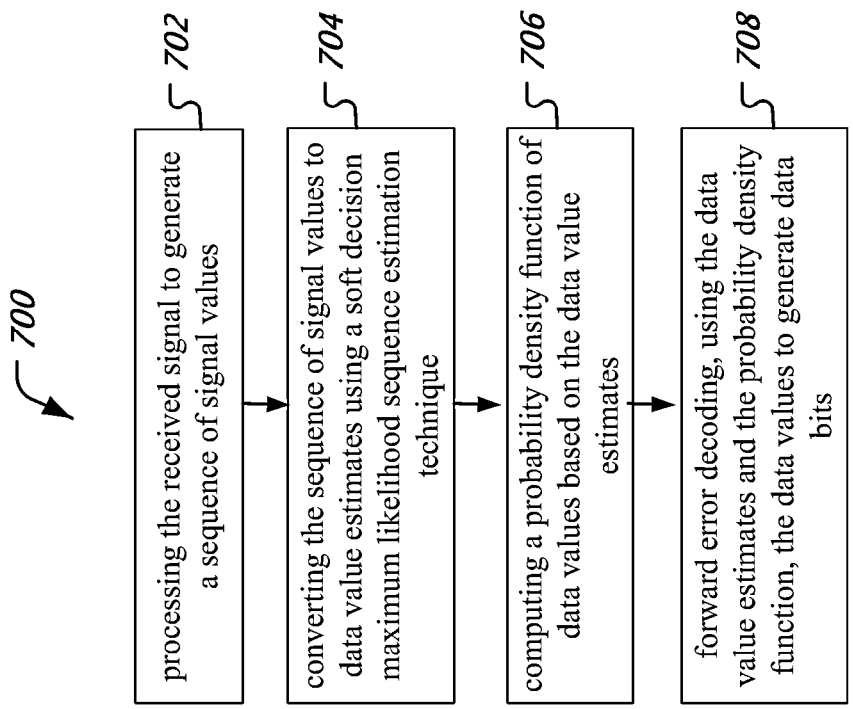
FIG. 7 is a flowchart representation of a process of receiving and decoding digital signals.

FIG. 7 is a flowchart description of a process 700 of generating data bits from a received signal. The process 700 can be implemented at a signal receiver, e.g., a receiver in a backbone network of an optical communications network.

At 702, the received signal is processed to generate a sequence of signal values. The process 700 may perform, e.g., the previously discussed receiver processing chain of FIG. 3 from the polarization detector PD to the output of the digital filter.

At 704, the sequence of signal values is converted to data value estimates using a soft decision maximum likelihood sequence estimation technique in which an estimation probability is associated with each data value estimate.

At 706, a probability density function (PDF) of data values is computed based on the data value estimates. The process 700 may compute the PDF, e.g., by generating a histogram of decision values.

At 708, using the data value estimates and the probability density function, the data values are forward error decoded to generate data bits. In some implementations, the PDF of data values may further be computed based on the generated data bits. Due to forward error decoding, the generated data bits may provide a more reliable estimate of the bits recovered from the received signal and therefore may be useful in improving accuracy of the PDF.

Figure 8:
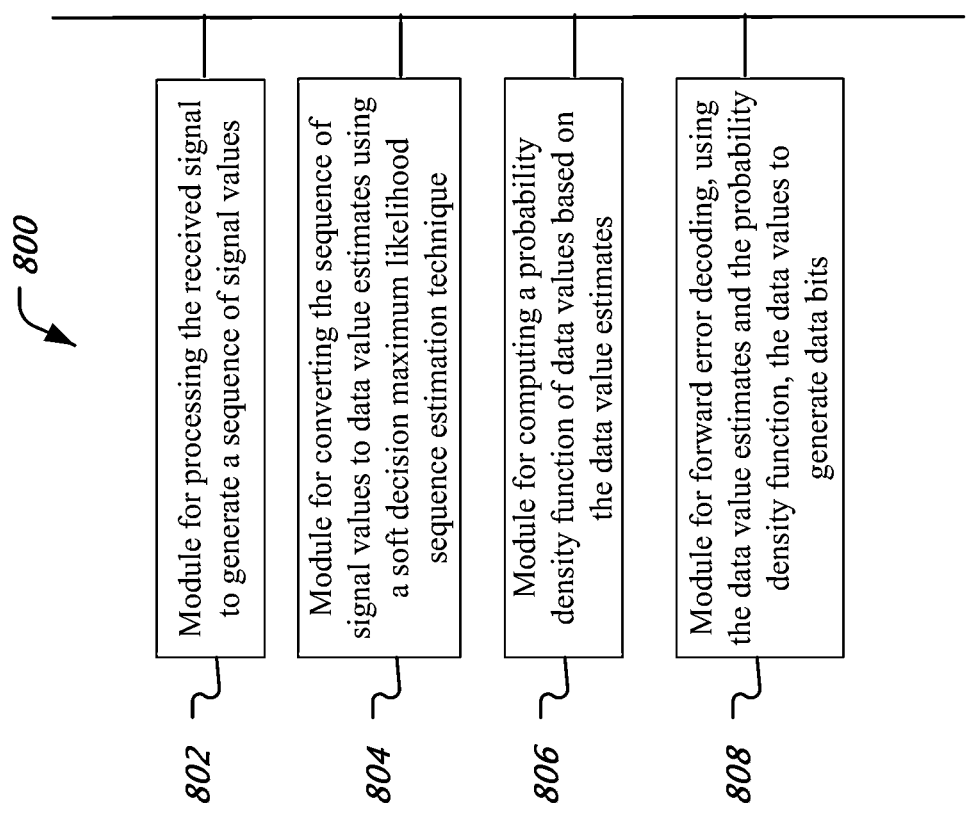
FIG. 8 is a block diagram representation of a digital receiver.

FIG. 8 is a block diagram representation of an apparatus 800 for generating data bits from a received signal. The received signal could be, e.g., a duo-binary modulated optical signal. The module 802 is for processing the received signal to generate a sequence of signal values. The module 802, e.g., may have an input at which the received signal is received, a processing component that generates the sequence of values. The module 804 is for converting the sequence of signal values to data value estimates using a soft decision maximum likelihood sequence estimation technique in which an estimation probability is associated with each data value estimate. The module 806 is for computing a probability density function of data values based on the data value estimates. The module 808 is for forward error decoding, using the data value estimates and the probability density function, the data values to generate data bits.

In some implementations, a data reception apparatus comprises a memory for storing instructions and a processor that executes the instructions and implements the above described process 700. In some implementations, an optical communication system includes an optical transmitter, an optical transmission line and an optical receiver that is configured to implement the process 700.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is what is described and illustrated, including:

1. A method of generating data bits from a received signal, comprising:
   processing the received signal to generate a sequence of signal values, wherein the received signal comprises a duobinary signal;
   converting the sequence of signal values to soft data value estimates using a soft decision maximum likelihood sequence estimation technique in which an estimation probability is associated with each data value estimate;
   estimating a probability density function of data values numerically based on a histogram of the soft data value estimates, the probability density function including two peaks showing a spread of probability values for different combinations of signal values from the duobinary signal; and
   forward error correcting, using the soft data value estimates and the probability density function, the data values by a soft decision forward error correction technique to generate data bits, wherein
   the estimated probability density function is fed into the forward error correcting for a log likelihood ratio (LLR) calculation, and
   the data bits are fed back to the estimating the probability density function to iteratively improve accuracy of the probability density function estimation.

2. The method of claim 1, wherein the received signal is an optical signal.

3. An apparatus generating data bits from a received signal, comprising:
   a receive chain that processes the received signal to generate a sequence of signal values, wherein the received signal comprises a duobinary signal;
   a maximum likelihood sequence estimation (MLSE) module that converts the sequence of signal values to soft data value estimates using a soft decision MLSE technique in which an estimation probability is associated with each data value estimate;
   a probability density function (PDF) module that estimates a probability density function of data values numerically based on a histogram of the soft data value estimates, the probability density function including two peaks showing a spread of probability values for different combinations of signal values from the duobinary signal; and
   a forward error decoding (FEC) module that performs soft-decision forward error correction, using the soft data value estimates and the probability density function, the data values to generate data bits, wherein
   the probability density function is fed into the forward error decoding module for a log likelihood ratio (LLR) calculation, and
   the data bits are fed back to the PDF module to iteratively improve accuracy of the probability density function estimation.

4. The apparatus of claim 3, wherein the received signal is an optical signal.

5. A data reception apparatus comprising:
   a memory for storing instruction code; and
   a processor that executes the instruction code to implement a method of generating data bits from a received signal that comprises a duobinary signal, the method comprising:
   processing the received signal to generate a sequence of signal values;
   converting the sequence of signal values to soft data value estimates using a soft decision maximum likelihood sequence estimation technique in which an estimation probability is associated with each data value estimate;
   estimating a probability density function of data values numerically based on a histogram of the soft data value estimates, the probability density function including two peaks showing a spread of probability values for different combinations of signal values from the duobinary signal; and
   forward error decoding, using the soft data value estimates and the probability density function, the data values by a soft decision forward error correction technique to generate data bits, wherein
   the estimated probability density function is fed into the forward error decoding for a log likelihood ratio (LLR) calculation, and
   the data bits are fed back to the estimating the probability density function to iteratively improve accuracy of the probability density function estimation.

6. The data reception apparatus of claim 5, wherein the received signal is an optical signal.

7. An optical communication system comprising:
an optical signal transmitter configured to transmit an error correction coded optical signal; and
an optical signal receiver configured to:
receive the error correction coded optical signal;
process the received signal to generate a sequence of signal values, wherein the received signal comprises a duobinary signal;
convert the sequence of signal values to soft data value estimates using a soft decision maximum likelihood sequence estimation technique in which an estimation probability is associated with each data value estimate;
estimate a probability density function of data values numerically based on a histogram of the soft data value estimates, the probability density function including two peaks showing a spread of probability values for different combinations of signal values from the duobinary signal; and
forward error decode, using the soft data value estimates and the probability density function, the data values by a soft decision forward error correction technique to generate data bits, wherein
the probability density function is fed into the forward error decode for a log likelihood ratio (LLR) calculation, and
the data bits are fed back to estimate the probability density function to iteratively improve accuracy of the probability density function estimation.

8. The optical communication system of claim 7, wherein the received signal is an optical signal.

* * * * *